United States Patent
Ridenour, II

(10) Patent No.: US 9,625,271 B2
(45) Date of Patent: Apr. 18, 2017

(54) SYSTEMS AND METHODS FOR TERRAIN WARNING SUPPRESSION USING FLIGHT PLAN INFORMATION

(75) Inventor: Richard Darrell Ridenour, II, Glendale, AZ (US)

(73) Assignee: AVIATION COMMUNICATION & SURVEILLANCE SYSTEMS LLC, Phoenix, AZ (US)

( * ) Notice: Subject to any disclaimer, the term of this patent is extended or adjusted under 35 U.S.C. 154(b) by 2600 days.

(21) Appl. No.: 12/041,868

(22) Filed: Mar. 4, 2008

(65) Prior Publication Data

US 2009/0082954 A1 Mar. 26, 2009

Related U.S. Application Data

(60) Provisional application No. 60/975,061, filed on Sep. 25, 2007.

(51) Int. Cl.
*G01C 21/00* (2006.01)
*G01C 23/00* (2006.01)
*G08G 5/00* (2006.01)

(52) U.S. Cl.
CPC ......... *G01C 23/005* (2013.01); *G08G 5/0052* (2013.01); *G08G 5/0086* (2013.01)

(58) Field of Classification Search
USPC ....................................... 701/206
See application file for complete search history.

(56) References Cited

U.S. PATENT DOCUMENTS

| 5,892,462 | A | 4/1999 | Tran | |
| 6,707,394 | B2 * | 3/2004 | Ishihara et al. | 340/970 |
| 7,321,813 | B2 | 1/2008 | Meunier | |
| 7,428,451 | B2 | 9/2008 | Artini et al. | |
| 2003/0184450 | A1 * | 10/2003 | Muller et al. | 340/963 |
| 2007/0067093 | A1 * | 3/2007 | Pepitone | 701/120 |
| 2007/0113629 | A1 * | 5/2007 | Lohmiller et al. | 73/85 |

FOREIGN PATENT DOCUMENTS

| EP | 1857781 A2 | 11/2007 |
| WO | WO2006/082301 A1 | 8/2006 |

OTHER PUBLICATIONS

"Approval Guidance for RNP Procedures with SAAAR," U.S. Department of Transportation and Federal Aviation Administration, Dec. 15, 2005.
"United States Standard for Required Navigation Performance (RNP) Instrument Approach Procedure Construction," FAA Order 8260.51, Dec. 30, 2002.
"United States Standard for Required Navigation Performance (RNP) Approach Procedures with Special Aircraft and Aircrew Authorization Required (SAAAR)," FAA Order 8260.52, Jun. 3, 2005.
"Technical Standard Order TSO-C151b: Terrain Awareness and Warning System," Dec. 17, 2002.

\* cited by examiner

*Primary Examiner* — Eliza Lam
(74) *Attorney, Agent, or Firm* — Squire Patton Boggs (US) LLP

(57) ABSTRACT

A method according to an aspect of the present invention includes determining if terrain presents a hazard to an aircraft based on the current position of the aircraft and the intended flight plan for the aircraft and providing an alert if it is determined that the terrain presents a hazard to the aircraft. The method may be employed in any situation to achieve any result, such as when the aircraft is in a low-RNP environment to prevent nuisance terrain alerts.

17 Claims, 8 Drawing Sheets

SYSTEMS AND METHODS FOR TERRAIN WARNING SUPPRESSION USING FLIGHT PLAN INFORMATION

CROSS-REFERENCE TO RELATED APPLICATION

This application claims priority to U.S. Provisional Patent Application Ser. No. 60/975,061, filed Sep. 25, 2007, the disclosure of which is incorporated by reference in its entirety.

DESCRIPTION OF THE INVENTION

Field of the Invention

The present invention relates to systems and methods for terrain warning suppression using flight plan information.

Background of the Invention

In some airports throughout the world, the presence of high terrain within zones around arriving aircraft (also known as "alert envelopes" or "clearance sensors") can result in alerts being generated by a terrain awareness and warning system (TAWS), even though the aircraft is safely flying the proper approach. These unnecessary alerts are referred to as "nuisance alerts," and may result in pilots and flight crews ignoring alerts from the TAWS altogether, even when there is an actual hazard. Nuisance TAWS alerts may also cause a pilot to take action that will result in harm to the aircraft, flight, crew, passengers, or cargo, such as to quickly pull up to avoid a perceived threat from terrain. Many of the approaches where these nuisance alerts occur may be referred to as low Required Navigation Performance approaches. Required Navigation Performance (RNP) refers to the navigation performance necessary for operation in a particular airspace. Low RNP approaches have a very low level of position error. A more detailed discussion of low RNP approaches may be found in: "*APPROVAL GUIDANCE FOR RNP PROCEDURES WITH SAAAR*," U.S. Department of Transportation and Federal Aviation Administration, Dec. 15, 2005; FAA Order 8260.51—"*UNITED STATES STANDARD for Required Navigation Performance (RNP) Instrument Approach Procedure Construction*"; and FAA Order 8260.52—"*UNITED STATES STANDARD FOR REQUIRED NAVIGATION PERFORMANCE (RNP) APPROACH PROCEDURES WITH SPECIAL AIRCRAFT AND AIRCREW AUTHORIZATION REQUIRED (SAAAR)*," each of which are incorporated herein by reference in their entirety. The functionality of TAWS in the United States is discussed further in "*US FAA Technical Standard Order C151b, Terrain Awareness and Warning System*," Dec. 17, 2002, and RTCA DO-161A, "*Minimum Performance Standards—Airborne Ground Proximity Warning Equipment*," both of which are incorporated herein by reference in their entirety As more accurate navigation equipment is installed on aircraft, and pilots are able to gauge their location with a higher degree of accuracy, such aircraft may be able to safely fly to more airports where the terrain clearance on approach will be relatively small. However, the close proximity of terrain to the aircraft may not be compatible with the relatively large clearance sensors or alert envelopes that conventional TAWS units use. Consequently, a conventional TAWS unit may generate false alerts to the flight crew, warning them of the "close" terrain, even though the aircraft is correctly flying the low RNP approach and is far enough away from the terrain to be safe. This may lead to catastrophic consequences in the event an aircraft is in actual danger of colliding with terrain and a TAWS alert is issued, yet goes unheeded by a flight crew that cannot determine whether the TAWS alert is indicative of a real hazard.

Additionally, conventional TAWS units may make simplistic assumptions about the projected flight path of the aircraft in order to perform certain functions, such as the Forward Looking Terrain Awareness (FLTA) function which looks ahead of an aircraft along and below the aircraft's lateral and instantaneous vertical flight path and provides alerts to a flight crew if a potential Controlled Flight Into Terrain (CFIT) threat exists. For example, a conventional TAWS may simply assume that if an aircraft is currently flying straight ahead, it will continue to do so. Such assumptions are not always correct. In the case of an RNP arrival that may require frequent maneuvering to keep the aircraft clear of terrain, these assumptions may frequently result in erroneous calculations by conventional TAWS units. The present invention addresses these and other issues.

SUMMARY OF THE INVENTION

Embodiments of the present invention can improve the level of safety of the flight by only generating alerts when they are truly appropriate so that pilots do not ignore actual alerts when a terrain hazard actually exists and do not take unnecessary actions that could lead to injury to the aircraft or its passengers where there is no actual terrain hazard.

One method according to various aspects of the present invention includes determining if terrain presents a hazard to an aircraft based on the current position of the aircraft and the intended flight plan for the aircraft and providing an alert if it is determined that the terrain presents a hazard to the aircraft. The method may be employed in any situation to achieve any result, such as when the aircraft is in a low-RNP environment to prevent nuisance terrain alerts.

A medium storing instructions according to various aspects of the present invention includes instructions executable by a processor to perform a method comprising: determining if terrain presents a hazard to an aircraft based on a current position of the aircraft and an intended flight plan for the aircraft, and providing an alert if it is determined that the terrain presents a hazard to the aircraft.

A system according to various aspects of the present invention comprises a processor, a user interface, and a memory. The memory is coupled to the processor and stores instructions that, when executed by the processor, cause the processor to determine if the terrain presents a hazard to the aircraft based on a current position of the aircraft and an intended flight plan for the aircraft, and provide an alert to a user through the user interface if it is determined that the terrain presents a hazard to the aircraft.

Both the foregoing summary and the following detailed description are exemplary and explanatory only and are not restrictive of the invention.

BRIEF DESCRIPTION OF THE DRAWINGS

A more complete understanding of the present invention may be derived by referring to the detailed description and claims when considered in connection with the following illustrative figures.

DETAILED DESCRIPTION OF EXEMPLARY EMBODIMENTS

Exemplary Systems

Figure 1:
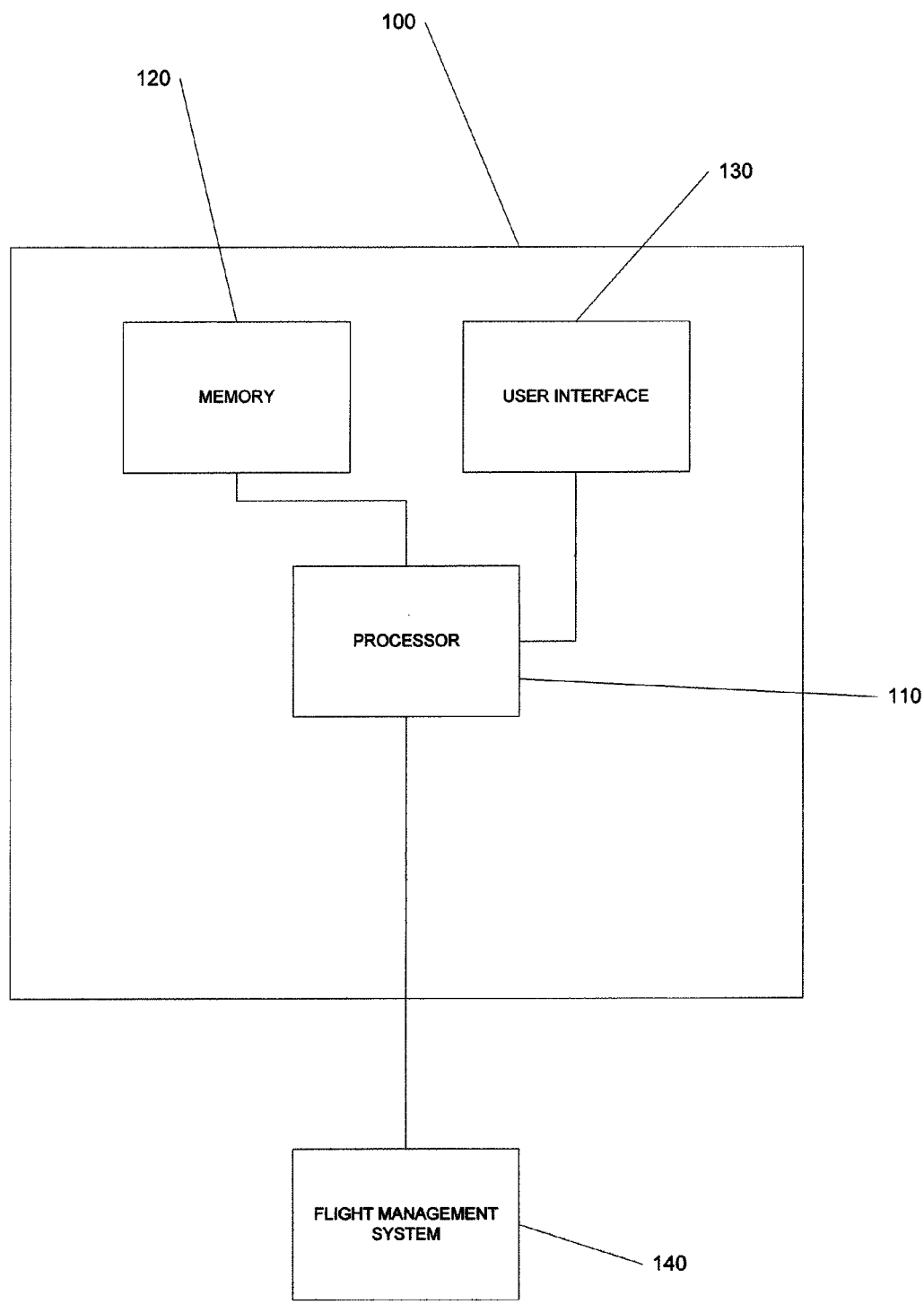
FIGS. 1 and 2 are block diagrams illustrating exemplary systems according to various aspects of the present invention.

An exemplary system according to aspects of the present invention is depicted in FIG. 1. This system may be used in conjunction with the system in FIG. 2, as well as with the method depicted in FIG. 3 (or any subset or combination of the elements thereof). The system shown in FIG. 1 may also be used in conjunction with any other suitable embodiments of systems and methods operating in accordance with the present invention. The components of the system depicted in FIG. 1 may be included in the same device, or among a plurality of different systems or devices. For example, in one embodiment of the present invention, the components of the system are included in a TAWS 100 aboard an aircraft. The TAWS 100 includes a processor 110, user interface 130, memory 120, and is coupled to a flight management system 140. In accordance with the present invention, the TAWS 100 can utilize information regarding the flight plan of the aircraft from the flight management system 140 to suppress unnecessary terrain warning alerts.

A method for terrain warning suppression according to aspects of the present invention can be implemented in any suitable manner, such as through the processor 110 of the TAWS 100 executing software instructions stored in the memory 120. The functionality of systems operating in conjunction with the present invention may also be implemented through various hardware components storing machine-readable instructions, such as application-specific integrated circuits (ASICs), field-programmable gate arrays (FPGAs) and/or complex programmable logic devices (CPLDs). Systems for terrain warning suppression according to aspects of the present invention may also operate in conjunction with any desired combination of software and/or hardware components.

The processor 110 can retrieve instructions and data stored in the memory 120 and other systems to perform methods for terrain warning suppression in accordance with the present invention. For example, the processor 110 may retrieve and process information regarding an aircraft's flight plan from the flight management system 140 and generate alerts and warnings via the user interface 130. Any number and type of processor(s) such as an integrated circuit microprocessor, microcontroller, and/or digital signal processor (DSP), can be used in conjunction with the present invention.

The processor 110 may interface and/or control any other desired components. In one exemplary embodiment of the present invention, the processor 110 processes information pertaining to an intended flight plan for an aircraft, and determines whether terrain poses a hazard to the aircraft based on the aircraft's position and the intended flight plan. The processor 110 can issue an appropriate alert to a pilot (i.e. through the user interface 130) where terrain poses a hazard to the aircraft.

The memory 120 stores instructions, data, and any other suitable information for use by the TAWS 100, as well as other systems and devices operating in conjunction with systems and methods of the present invention. The memory 120 may include any combination of different memory storage devices and computer-readable media, such as hard drives, tape drives, random access memory (RAM), read only memory (ROM), FLASH memory, compact discs, optical discs, or any other type of volatile and/or nonvolatile memory. Any number of memory storage devices of any size and configuration may also be used in conjunction with the present invention. In one embodiment of the present invention, the memory 120 stores computer-readable instructions that can be executed by the processor to perform the method depicted in FIG. 3.

The user interface 130 provides alerts and information to one or more users (such as a pilot or flight crew member), and allows users to provide commands and data to the TAWS 100. The user interface 130 may include any number of and type of input device (not shown) to receive commands, data, and other suitable input from a user. Similarly, the user interface 130 may include any number and type of output device (not shown) to provide users with data, alerts, and other suitable information from the TAWS 100.

In one exemplary embodiment of the present invention, the user interface 130 in the TAWS 100 provides terrain information on a display system, such as a weather radar display or other video output device. In this system, visual and aural signals are also provided to a flight crew for both caution and warning alerts. A "caution alert" as used herein is provided when a potentially hazardous flight condition is encountered, immediate crew/pilot attention is required, and a potential for crew/pilot action exists. In a TAWS, a typical caution alert can be provided in the form of an audible notification of a flight condition, e.g., "terrain ahead" and/or corresponding visual indicators of the flight condition, such as an amber or yellow light on a display. A "warning alert" as used herein is provided when a potentially hazardous flight condition is encountered and immediate crew/pilot action is required to avoid a hazardous flight condition. A warning alert may be in the form of an audible instruction to take action (e.g., "terrain, terrain; pull up, pull up") and corresponding visual indicator (e.g., a red light or symbol on a cockpit display) notifying a crew or pilot that action is required to avoid an imminent threat. The differences between these alert types can distinguish between severities of threats from terrain an aircraft encounters during flight. A TAWS operating in conjunction with the present invention may provide alerts in any other desired manner.

The TAWS 100 in the exemplary embodiment of the present invention depicted in FIG. 1 receives information pertaining to the intended flight plan of an aircraft from a Flight Management System (FMS) 140. An FMS 140 may be used by pilots or flight crews to perform any number of functions for an aircraft, including flight planning, navigation, performance management, guidance, and/or monitoring flight progress. Alternate embodiments of the present invention may receive information regarding the intended flight plan of an aircraft from any other suitable source. The FMS 140 may comprise a single system or may include any number of individual systems. The FMS 140 may be located on the same aircraft as the TAWS system 100. Alternately, the FMS 140 could reside on another aircraft, at a ground station (such as an air traffic control station), or at any other suitable location. The FMS 140 may communicate with the TAWS 100 in any suitable manner.

A FMS 140 may be implemented in any manner, may include any suitable components, and may operate in conjunction with any other desired systems. For example, referring to FIG. 2, a FMS 140 in one embodiment of the present invention comprises a Flight Management Computer (FMC) 210, a Flight Control Unit (FCU) display 220, a navigation display 230, a guidance display 240, and a user interface 250.

Figure 2:
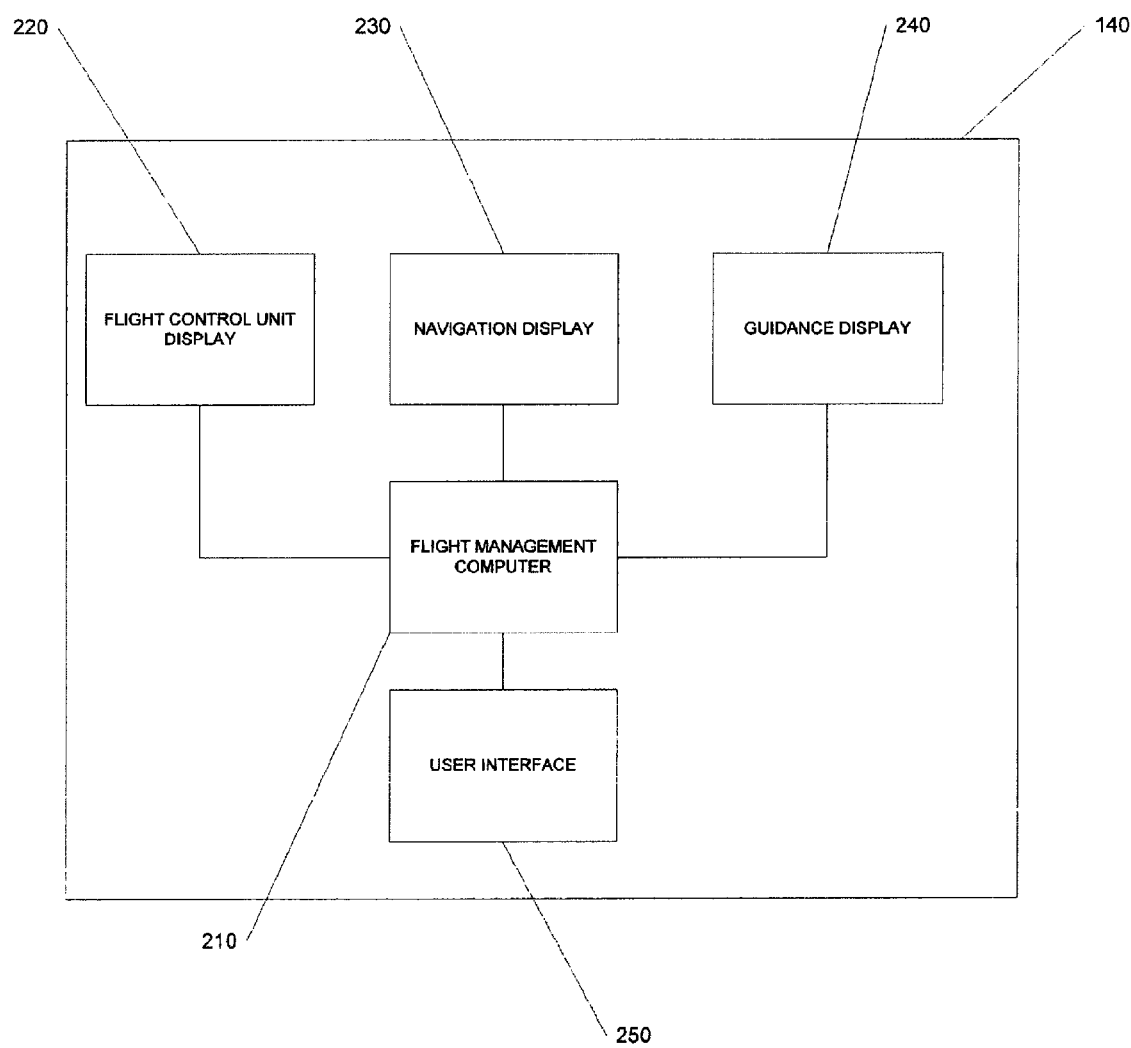

In the exemplary FMS 140 depicted in FIG. 2, the FMC 210 includes a memory storing information pertaining to the intended flight plan of the aircraft on which the FMS 140 is located. The FMS 140 may interface with any number of other systems to determine a flight plan for the aircraft, such as databases or other systems that have access to navigation information, as well as sensors and systems aboard the aircraft, including collision avoidance systems and terrain awareness systems. A preplanned intended flight plan for an aircraft can be uploaded from a database maintained by an airline to the FMS 140. The FMS 140 interfaces with an autopilot system to allow the autopilot to automatically navigate portions of the intended flight plan. Similarly, the FMS 140 may interface with the TAWS 100 to provide information regarding the intended flight plan.

An FMS 140 according to the present invention may include any other desired components, such as additional displays, computer systems, processors, data storage devices, user interface features, and/or device interfaces. Any of the components in an FMS used in conjunction with the present invention may be separate from, or combined with, any other suitable system or device.

The TAWS 100 or other system operating in conjunction with the present invention can include any suitable circuit, component, device, and system for communicating with any other device.

Exemplary Methods

Figure 3:
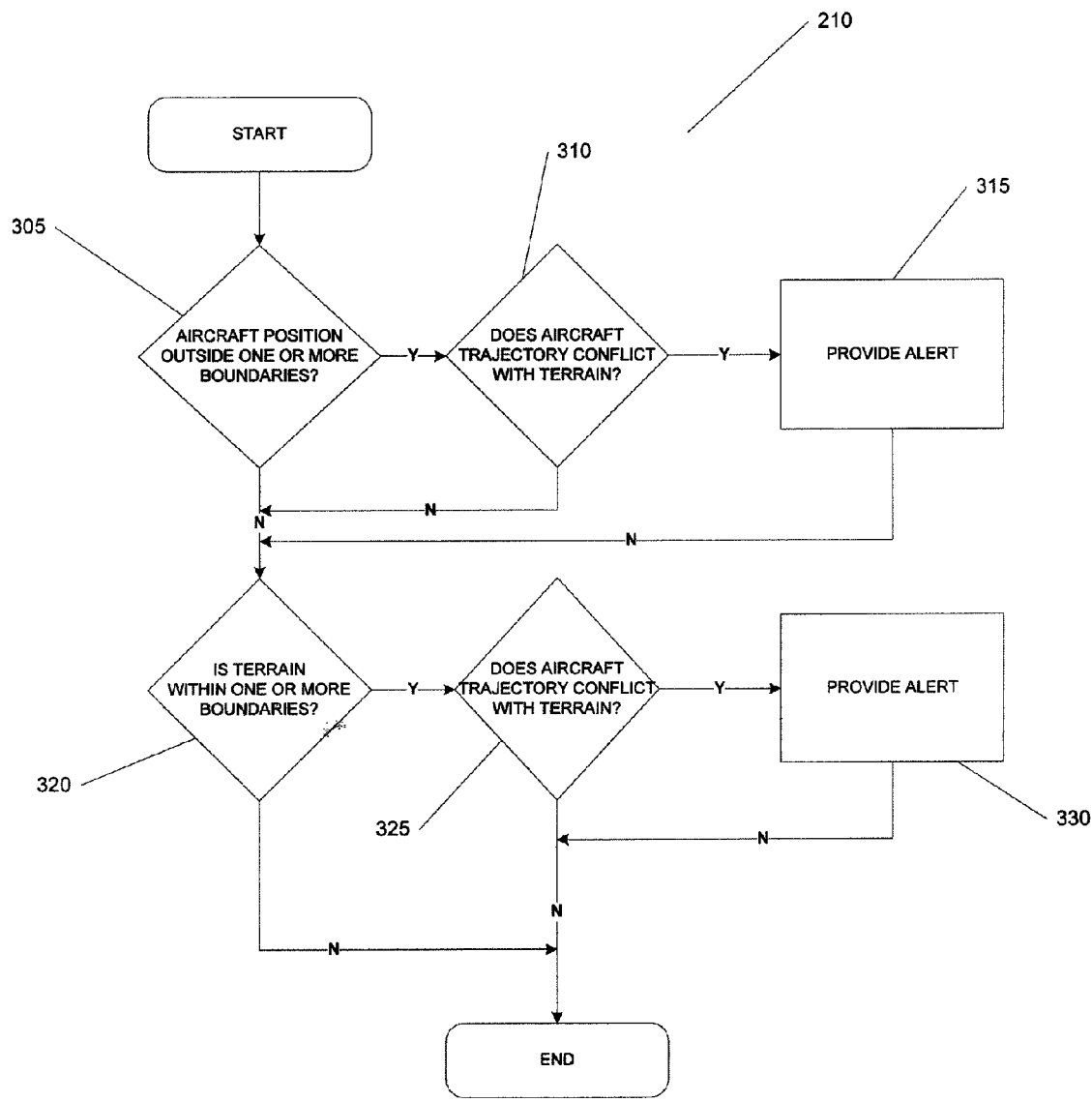
FIG. 3 depicts a flow diagram of an exemplary method according to various aspects of the present invention.

An exemplary method according to various aspects of the present invention is depicted in FIG. 3. This method may be implemented in any desired manner, such as through software operating in a TAWS unit aboard an aircraft. The elements of this method, as with any method in accordance with the present invention, may be practiced in any suitable order and in conjunction with any other desired methods, in whole or in part.

In the exemplary method in FIG. 3, the position of the aircraft is compared to one or more boundaries around an intended flight plan for the aircraft. If the aircraft is outside one or more of the boundaries (305) and the trajectory of the aircraft is in conflict with the terrain (310), an alert is provided (315). Alternatively, an alert is provided (330) if terrain is found within one or more boundaries around the aircraft (320) and the aircraft's trajectory conflicts with the terrain (325).

In accordance with various aspects of the present invention, any number of boundaries may be defined around an intended flight plan of an aircraft. The boundaries may at least partially define one or more volumes or two-dimensional areas. The volumes or areas within the one or more boundaries can be monitored using systems and methods according to the present invention with respect to the position of the aircraft and the position of the terrain and provide appropriate alerts. The boundaries may be of any size, shape, and dimension. A boundary may also be defined along any number of different planes, and need not have any particular relationship with any other defined boundary.

Figure 4:
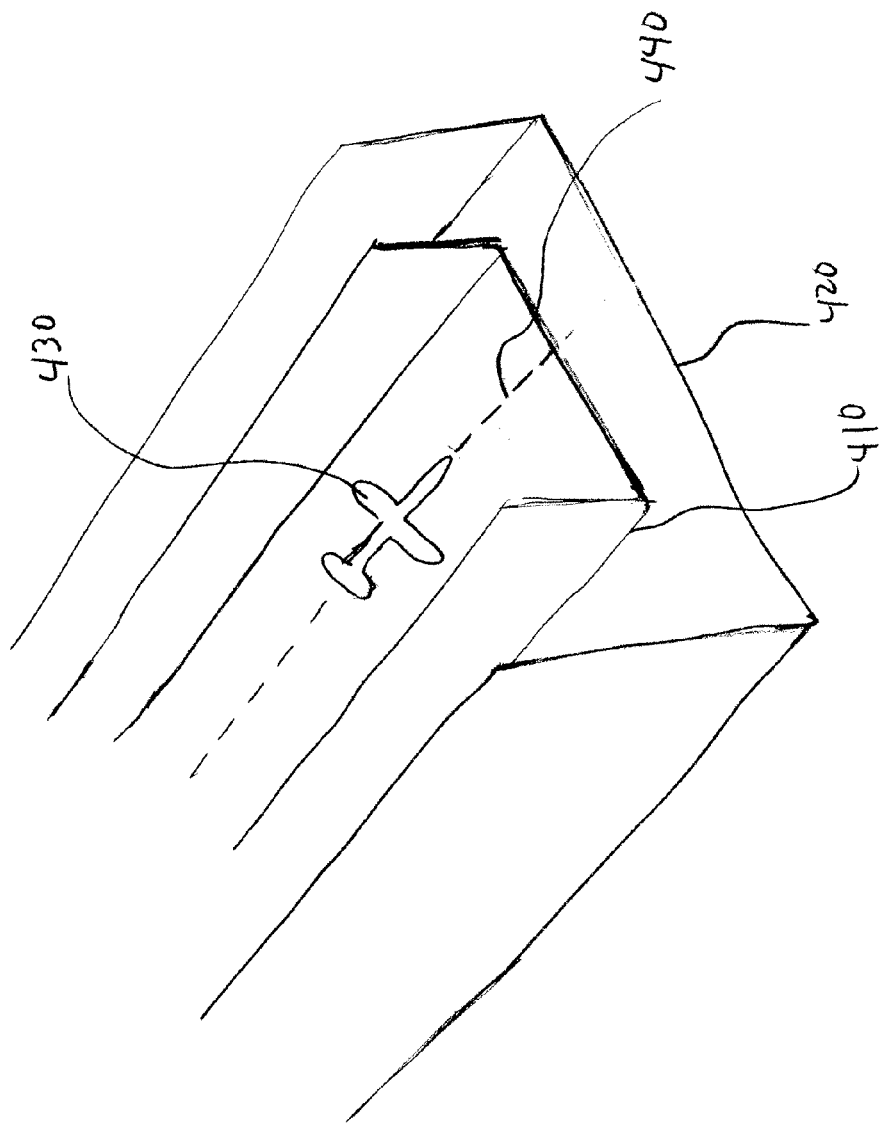
FIGS. 4-8 are diagrams illustrating the operation of the exemplary method of FIG. 3 according to various aspects of the present invention.
Figure 5:
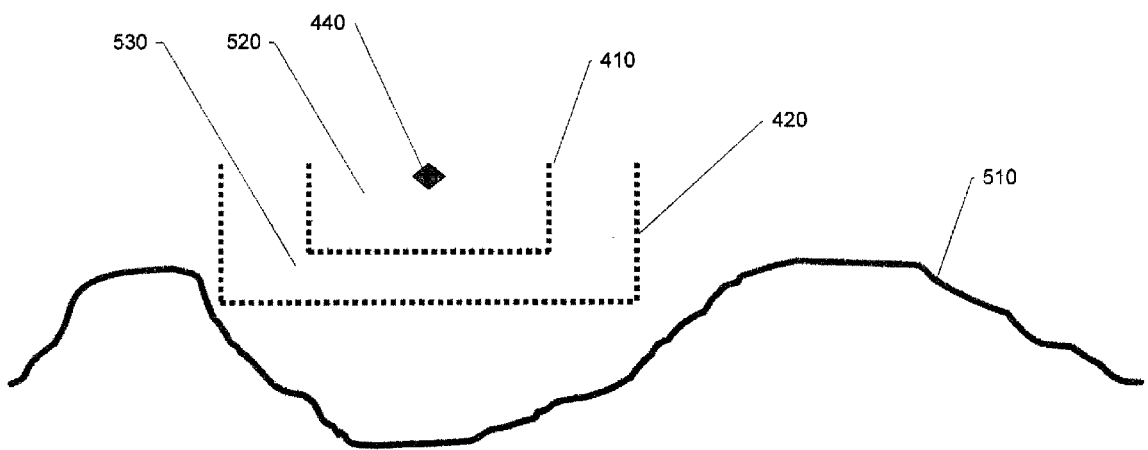

For example, FIG. 4 depicts a perspective view of two boundaries (an inner boundary 410 and outer boundary 420) that each partially surround an intended flight plan 440 traveled for an aircraft 430. FIG. 5 depicts a two-dimensional frontal view of the boundaries 410, 420 around the flight plan 440 in relation to a terrain profile 510. The boundaries 410, 420 each extend along the intended flight plan 440 and partially surround the intended flight plan 440 as shown. In this example, the boundaries 410, 420 do not fully encompass the flight plan 440 in order to monitor terrain warnings below and adjacent the flight plan 440. However, boundaries in alternate embodiments of the present invention may encompass any desired portion(s) of the flight plan. Additionally, while the cross-section of the boundaries 410, 420 are depicted as rectangular, boundaries in alternate embodiments may be of any desired size, shape, and geometry.

Figure 6:
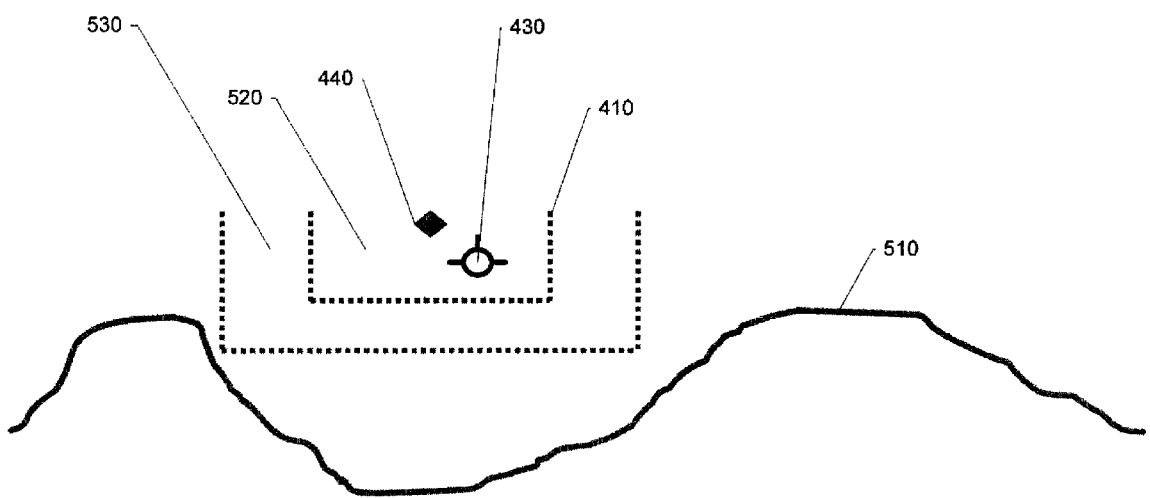

Any number of boundaries may be selected for use with the present invention. An aircraft's position may be monitored with respect to a boundary (or any volume defined by a boundary) and/or the position of terrain, for any desired purpose. In FIGS. 5 and 6, for example, the inner boundary 410 defines an inner volume 520 around the aircraft's intended flight plan 440 and within which the aircraft 430 is intended to fly. Referring to FIG. 6, when the aircraft 430 is flying within the inner volume 520, terrain warning alerts are suppressed for terrain outside the outer boundary 420, reflecting that the aircraft 430 is within a safe distance from its intended flight plan 440.

While the exemplary boundaries 410,420 depicted in FIGS. 4-8 are concentric (i.e. the outer boundary 420 surrounds the inner boundary 410), boundaries in the present invention need not have any particular relationship to each other. For example, one boundary could surround only a portion of another boundary, and multiple boundaries may intersect with each other. Likewise, the distance between boundaries need not be uniform at all points. For example, in an alternate embodiment, an outer boundary may be defined closer to an inner boundary directly below the intended flight plan of an aircraft and farther from the inner boundary at other points.

Figure 7:
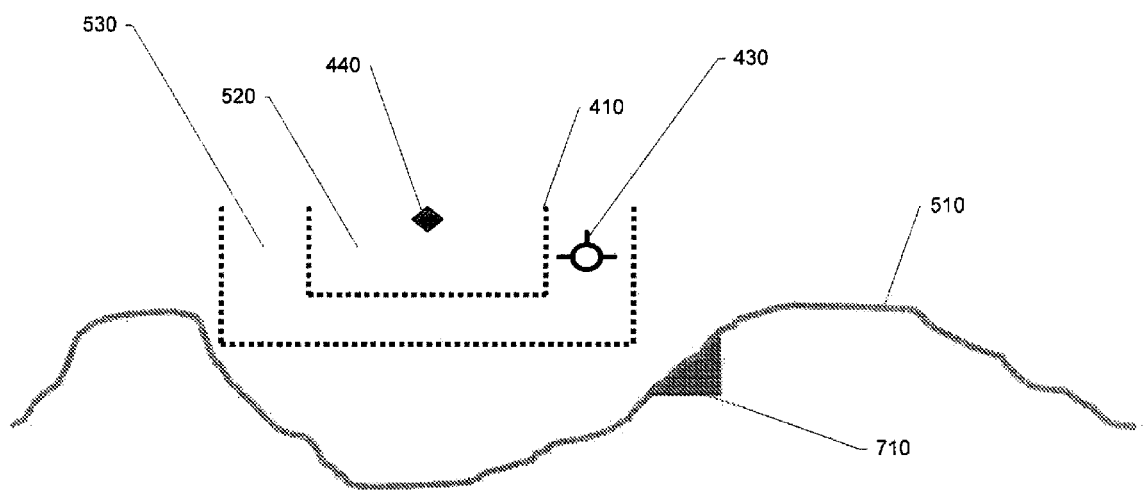

The fact that the aircraft 430 has flown beyond the inner volume 520 need not necessarily trigger an alert, particularly where the aircraft is not in danger from a terrain hazard. For example, referring to FIG. 7, a warning may be issued to the pilot and/or flight crew of the aircraft 430 if the aircraft 430 flies outside of the inner volume 520 and where the trajectory of the aircraft 430 is also in conflict with the terrain 510 (See, e.g., FIG. 3-305, 310, 315). In FIG. 7, for example, a determination that the aircraft 430 is in conflict with the shaded portion 710 of terrain 510 can prompt a terrain alert warning to the pilot and flight crew aboard the aircraft 430.

Figure 8:
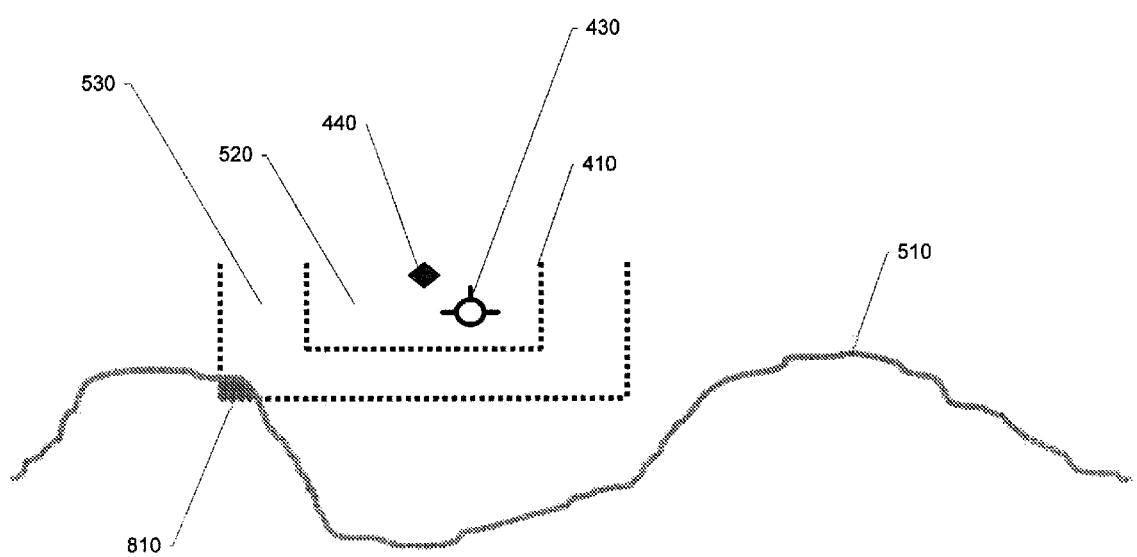

Referring to FIG. 8, regardless of the aircraft's 430 position within the inner volume 520, the encroachment of terrain 510 into the outer volume 530 (such as shaded portion 810) can trigger a warning when the encroaching terrain 810 is in conflict with the aircraft 430. As shown in FIG. 8, for example, the aircraft 430 is within the inner volume 520, but since the shaded portion 810 of terrain 510 is within the outer boundary 530, an alert may be issued where the portion 810 conflicts with the trajectory of the aircraft 430.

The size, shape, dimensions, and other characteristics of a boundary (or the volume it defines) may be selected in any manner and according to any desired criteria. For example, one or more of the dimensions of the inner boundary 410 depicted in FIGS. 4-8 can be selected to be large enough so that normal flight technical error (FTE) (a measure of how well the pilot or autopilot is able to maintain an aircraft's position on the desired flight plan) will not cause the aircraft to fly outside the inner volume 520. Similarly, the dimensions of the inner boundary 410 may be selected such that an alert issued when the aircraft flies outside the inner boundary 410 will allow a pilot adequate time to avoid a terrain hazard. The dimensions of the inner boundary 410 can also be selected based on any other suitable criteria, such as a navigation system error (NSE) for the aircraft (which reflects the error in the aircraft's measured position due to navigation instruments, such as global positioning systems) and/or a total system error (TSE) for the aircraft (which reflects the combined FTE and NSE). The dimensions of the inner boundary 410 may also be selected based on a required navigation performance (RNP) of a procedure performed by the aircraft, and/or a required obstacle clearance (ROC) of a procedure performed by the aircraft.

Similarly, one or more of the dimensions of the outer boundary 420 may be selected to provide a desired amount of protected airspace required to avoid a terrain hazard during a particular maneuver. The outer boundary 420 may be selected based on the state of the aircraft, such as the aircraft's bank angle, rate of turn, rate of acceleration, vertical speed, vertical velocity, flight path angle, and/or the lateral navigation mode (LNAV) status indicator of an autopilot aboard the aircraft (which reflects whether the autopilot is following the intended flight plan). The outer boundary 420 may also be selected based (in whole or in part) on any of the criteria described above for the inner boundary 410, and vice versa.

A determination that the aircraft 430 is in conflict with the terrain 510 may be made in any desired manner and can be based on any number of suitable factors. For example, the TAWS of an aircraft in flight may process information regarding an aircraft's current or projected position, track, altitude, flight path angle and intended flight plan to determine a projected flight path for the aircraft. This information may be analyzed, along with available terrain data, to determine if any terrain poses a hazard to the aircraft. The terrain data may be of any type, derived from any source, and may be in any format. For example, terrain data may include coordinates and associated altitudes of terrain features as identified by radar imaging, GPS (Global Positioning System) or other known ways of surveying terrain features and stored in a terrain database accessible by the TAWS. Terrain that conflicts with the projected flight path of the aircraft can generate a terrain alert for the pilot of the aircraft. TAWS alerts are preferably consistent with the standard set of visual and aural alerts for caution and/or warning alerts discussed in TSO-C151a. For example, a terrain warning alert may sound an audible indicator such as "Terrain, Terrain; Pull-up, Pull-up." Terrain alerts can persist as long as the terrain threat continues to conflict with the projected flight path of the aircraft.

A TAWS operating in conjunction with the present invention need not necessarily issue an alert when it is determined that the aircraft is properly following an intended flight plan, even when the terrain conflicts with the projected flight path for the aircraft. This allows nuisance alerts to be suppressed during, for example, low RNP approaches where the aircraft is a safe distance from terrain hazards. However, if the aircraft has deviated from its intended flight plan, a TAWS alert may be issued to notify the pilot of other member of the flight crew of a terrain hazard. Additionally, a terrain alert may cease or be modified to a lower threat mode when the pilot maneuvers the aircraft to avoid a conflict with a terrain hazard and/or to put the aircraft back within a predetermined boundary from its intended flight plan.

Any combination and/or subset of the elements of the methods of the present invention may be practiced in any suitable order and in conjunction with any system, device, and/or process. The systems and methods of the present invention may be employed in any suitable situation, such as low-RNP environments or other cases where an aircraft would otherwise experience nuisance terrain warning alerts.

The particular implementations shown and described above are illustrative of the invention and its best mode and are not intended to otherwise limit the scope of the present invention in any way. Indeed, for the sake of brevity, conventional data storage, data transmission, and other functional aspects of the systems may not be described in detail. Methods illustrated in the various figures may include more, fewer, or other steps. Additionally, steps may be performed in any suitable order without departing from the scope of the invention. Furthermore, the connecting lines shown in the various figures are intended to represent exemplary functional relationships and/or physical couplings between the various elements. Many alternative or additional functional relationships or physical connections may be present in a practical system.

Changes and modifications may be made to the disclosed embodiments without departing from the scope of the present invention. These and other changes or modifications are intended to be included within the scope of the present invention, as expressed in the following claims.

What is claimed is:

1. A method comprising:
   determining, with a processor, if terrain presents a hazard to an aircraft based on a current position of the aircraft and an intended flight plan for the aircraft; and
   providing an alert if it is determined that the terrain presents a hazard to the aircraft;
   wherein determining if the terrain presents a hazard to the aircraft further includes at least one of:
   determining if the current position of the aircraft is within any of one or more boundaries, each boundary surrounding at least a portion of the intended flight plan; and
   determining if the terrain is within the one or more boundaries.

2. The method of claim 1, wherein the one or more boundaries include an inner boundary and an outer boundary, and wherein the outer boundary at least partially surrounds the inner boundary.

3. The method of claim 2, further comprising determining, with the processor, that the terrain presents a hazard to the aircraft when the terrain is located within the outer boundary and when an estimated trajectory for the aircraft conflicts with the terrain.

4. The method of claim 2, further comprising determining, with the processor, that the terrain presents a hazard to the aircraft when the current position of the aircraft is located outside the inner boundary and when an estimated trajectory for the aircraft conflicts with the terrain.

5. The method of claim 2, wherein one or more dimensions of at least one of the inner boundary and the outer boundary are selected based on at least one of:
   a normal flight technical error (FTE) for the aircraft;
   a navigation system error (NSE) for the aircraft;
   a required navigation performance (RNP) of a procedure performed by the aircraft;
   a required obstacle clearance (ROC) of a procedure performed by the aircraft;
   a total system error (TSE) for the aircraft; and
   a desired time period to respond to an alert.

6. The method of claim 2, wherein one or more dimensions of at least one of the inner boundary and the outer boundary are selected based on one or more of:
   a bank angle for the aircraft;
   a rate of turn for the aircraft;

a rate of acceleration for the aircraft;
a status indicator of an autopilot aboard the aircraft;
a vertical speed of the aircraft;
a vertical velocity of the aircraft;
a flight path angle of the aircraft; and
a lateral navigation mode (LNAV) for the aircraft.

7. A medium storing instructions executable by a processor to perform a method, the medium being non-transitory and the method comprising:
   determining if terrain presents a hazard to an aircraft based on a current position of the aircraft and an intended flight plan for the aircraft; and
   providing an alert if it is determined that the terrain presents a hazard to the aircraft;
   wherein determining if the terrain presents a hazard to the aircraft further includes at least one of:
   determining if the current position of the aircraft is within one or more boundaries, each boundary surrounding at least a portion of the intended flight plan; and
   determining if the terrain is within the one or more boundaries.

8. The medium of claim 7, wherein the one or more boundaries include an inner boundary and an outer boundary, and wherein the outer boundary at least partially surrounds the inner boundary.

9. The medium of claim 8, wherein the method further comprises determining that the terrain presents a hazard to the aircraft when the terrain is located within the outer boundary and when an estimated trajectory for the aircraft conflicts with the terrain.

10. The medium of claim 8, wherein the method further comprises determining that the terrain presents a hazard to the aircraft when the current position of the aircraft is located outside the inner boundary and when an estimated trajectory for the aircraft conflicts with the terrain.

11. A system comprising:
    a processor;
    a user interface; and
    a memory coupled to the processor and storing instructions that, when executed by the processor, cause the processor to:
    determine if the terrain presents a hazard to the aircraft based on a current position of the aircraft and an intended flight plan for the aircraft; and
    provide an alert to a user through the user interface if it is determined that the terrain presents a hazard to the aircraft;
    wherein determining if the terrain presents a hazard to the aircraft further includes at least one of:
    determining if the current position of the aircraft is within one or more boundaries, each boundary surrounding at least a portion of the intended flight plan; and
    determining if the terrain is within one or more of the boundaries.

12. The system of claim 11, further comprising a flight management system in communication with the processor, the flight management system for providing the processor with information pertaining to the intended flight plan of the aircraft.

13. The system of claim 11, wherein the one or more boundaries include an inner boundary and an outer boundary, and wherein the outer boundary at least partially surrounds the inner boundary.

14. The system of claim 13, wherein the memory further stores instructions to cause the processor to determine that the terrain presents a hazard to the aircraft when the terrain is located within the outer boundary and when an estimated trajectory for the aircraft conflicts with the terrain.

15. The system of claim 13, wherein the memory further stores instructions to cause the processor to determine that the terrain presents a hazard to the aircraft when the current position of the aircraft is located outside the inner boundary and when an estimated trajectory for the aircraft conflicts with the terrain.

16. The system of claim 13, wherein one or more dimensions of at least one of the inner boundary and the outer boundary are selected based on at least one of:
    a normal flight technical error (FTE) for the aircraft;
    a navigation system error (NSE) for the aircraft;
    a required navigation performance (RNP) of a procedure performed by the aircraft;
    a required obstacle clearance (ROC) of a procedure performed by the aircraft;
    a total system error (TSE) for the aircraft; and
    a desired time period to respond to an alert.

17. The system of claim 13, wherein one or more dimensions of at least one of the inner boundary and the outer boundary are selected based on one or more of:
    a bank angle for the aircraft;
    a rate of turn for the aircraft;
    a rate of acceleration for the aircraft;
    a status indicator of an autopilot aboard the aircraft;
    a vertical speed of the aircraft;
    a vertical velocity of the aircraft;
    a flight path angle of the aircraft; and
    a lateral navigation mode (LNAV) for the aircraft.

* * * * *